United States Patent

Buffat et al.

[11] Patent Number: 5,889,608
[45] Date of Patent: *Mar. 30, 1999

[54] ARCHITECTURAL ELECTROCHROMIC PANE

[75] Inventors: Bernard Buffat, Paris; Francis Defendini, Rueil Malmaison; Christian Padoy, Gonesse, all of France; Jean-Pierre Beaufays, Jemeppe sur Sambre; Jean-Marie Labbe, Aische en Refail, both of Belgium

[73] Assignee: Saint-Gobain Recherche, Aubervilliers Cedex, France

[*] Notice: The term of this patent shall not extend beyond the expiration date of Pat. No. 5,657,149.

[21] Appl. No.: 873,863

[22] Filed: Jun. 12, 1997

Related U.S. Application Data

[63] Continuation of Ser. No. 63,947, May 20, 1993, Pat. No. 5,657,149.

[30] Foreign Application Priority Data

May 21, 1992 [FR] France .................. 92 06172

[51] Int. Cl.⁶ .............. G02F 1/153; G02B 5/20; F21V 9/06
[52] U.S. Cl. ............ 359/273; 359/275; 359/350; 359/361
[58] Field of Search ................ 359/350, 359, 359/360, 275, 273, 361

[56] References Cited

U.S. PATENT DOCUMENTS

| | | |
|---|---|---|
| 3,046,085 | 10/1962 | Brown et al. . |
| 4,380,994 | 4/1983 | Seemann . |
| 4,848,875 | 7/1989 | Baughman et al. . |
| 4,902,081 | 2/1990 | Huffer ......................... 359/360 |
| 4,902,110 | 2/1990 | Green . |
| 4,988,917 | 1/1991 | Hashimoto et al. . |
| 5,124,833 | 6/1992 | Barton et al. . |
| 5,136,419 | 8/1992 | Shabrang . |
| 5,148,306 | 9/1992 | Yamada et al. . |
| 5,239,406 | 8/1993 | Lynam . |
| 5,657,149 | 8/1997 | Buffat et al. ......................... 359/350 |

FOREIGN PATENT DOCUMENTS

| | | |
|---|---|---|
| 0 086 873 A1 | 8/1983 | European Pat. Off. . |
| 0 437 914 A2 | 7/1991 | European Pat. Off. . |
| 3125085 | 1/1983 | Germany . |
| 3414172 A1 | 10/1985 | Germany . |
| WO 90/00265 | 1/1990 | WIPO . |

*Primary Examiner*—Cassandra Spyrou
*Assistant Examiner*—Audrey Chang
*Attorney, Agent, or Firm*—Oblon, Spivak, McClelland, Maier & Neustadt, P.C.

[57] ABSTRACT

This invention relates to an electrically controllable solar building pane composed of two panels spaced apart by a layer of an intermediate gas, the panel facing towards the outside of the building being constituted of a variable transmission system of the electrochromic type comprising two transparent substrates composed, notably, of glass sheets, joined together by an ion-conducting organic polymer and coated on the jointing face with transparent electrically conducting films and films of anodic and cathodic electrochromic materials.

63 Claims, 4 Drawing Sheets

FIG_1

FIG_2

FIG_3

FIG_4

FIG. 5

ARCHITECTURAL ELECTROCHROMIC PANE

This is a Continuation of application Ser. No. 08/063,947 filed on May 20, 1993, now U.S. Pat. No. 5,657,149.

BACKGROUND OF THE INVENTION

1. Field of the Invention

This invention relates to an architectural electrochromic pane; more specifically, the invention relates to a building pane, of which the transmission, reflection and energy-absorption factors can be modified by an electrical control.

2. Discussion of the Background:

For several years now, the development of air-conditioning systems has created an increasing demand for panes having a low solar gain factor, or in other words glazing panes which contribute as little as possible to the rise in temperature inside the building. For this purpose, architects have turned towards panes comprising a reflective glass for solar protection produced by deposition of a mineral film onto a clear glass or glass tinted within the mass, the deposition being carried out, for example, by a pyrolysis technique or a cathodic sputtering technique under vacuum of a film of metallic oxides.

Unfortunately, the immediate effect of these solar protection films is a reduction in the light transmission which, in the case of the most efficient products, from the point of view of the solar gain factor, requires the almost permanent need for artificial lighting inside the building. It will certainly be understood that this decrease in light transmission is to a large degree unavoidable if it is compared with the physical definition of the solar factor of a pane. That is to say, the solar factor is the ratio of the total energy entering the room through the pane, to the incident solar energy, the total energy being the sum of the solar energy entering by direct transmission and of the energy given up by the pane to the internal environment as a consequence of its heating up by energy absorption. In practice, furthermore, the user makes his choice above all on the basis of the light transmission level, the solar factor being a fallout from this choice.

On the other hand, the sunshine conditions vary from one period of the year to the other and according to the time of day. At the approach to nightfall or in winter in cold or temperate climates, the first concern is a high transmission of light. In contrast, during periods of high sunshine, a sufficient illumination can be obtained even with a very low light transmission percentage; the important thing then is certainly the solar reduction factor, in order to reduce the cost of air conditioning. Finally, and independently of all the sunshine conditions, it may be useful to darken a glazing pane, for example during a video projection.

It was, notably, with the objective of providing an evolutionary solution that electrochromic panes have been developed, that is to say very generally, panes having electrically controlled optical properties. To date, various electrochromic systems have been proposed for applications such as display devices, rear view mirrors with an antidazzle position or again automobile roofs, but no building glazing pane has been fully developed, since this application has always appeared in the technical literature as a still remote objective, not likely to be realized in the short term.

According to an article that appeared in "Solar Energy Materials", volume 22, no. 1, March 1991, Susan Reilly, Deriush Arnateh and Stephen Selkowitz have developed, from calculated models, what they believe to be the optimum configurations for the purpose of reducing the air-conditioning (cooling) and illumination loads. Although this article refers to purely theoretical electrochromic systems, they concluded that in the case of a monolithic pane it is preferable to place the electrochromic system on the face which is towards the outside, whereas in the case of double glazing, the system should preferably be placed on the panel which is towards the outside, but facing towards the intermediate layer of air. Furthermore, these authors mention the advantage of incorporating, in addition, one or more "static" selective films, such as low-emissivity films or sheets of tinted glass.

This article does not, however, take into account the practical constraints of the production of a building pane nor of the fact that an electrochromic system should, if possible, be placed in specific conditions suitable for preventing its degradation.

SUMMARY OF THE INVENTION

Accordingly, one object of the present invention is to provide a pane with electrically controllable solar properties, particularly suitable for a building configuration.

The object of the present invention, is provided for by an electrically controllable solar building pane composed of two panels spaced apart by a layer of an intermediate gas, the panel facing towards the outside of the building being constituted of a variable transmission system of the electrochromic type comprising two transparent substrates composed, notably, of glass sheets, joined together by an ion-conducting organic polymer and coated on the jointing face with transparent electrically conducting films and films of anodic and cathodic electrochromic materials.

The building pane defined in this way is a multiple glazing pane, a circumstance which of itself begins to address the question of managing the solar gains, or which at least moves in the direction of reducing them.

The second characteristic of the pane according to this invention is the presence of an electrochromic panel as the outer panel of the two panel pane. For this reason, the hot wall constituted of the electrochromic panel in its colored state is insulated from the occupied space. In the case of an electrochromic pane mounted as "single" glazing, on the contrary, the efficiency of the glazing is not in question if the quantity of solar radiation transmitted through the wall is alone considered, but the panel itself becomes a source of heat by reason of its becoming heated, and even if it is assumed that this heat in not re-emitted to the interior of the building in the form of radiation, it will behave as a radiator which heats by conduction.

BRIEF DESCRIPTION OF THE DRAWINGS

Other details and advantageous characteristics of the invention will become apparent from the description given below prepared with reference to the attached drawings, which show.

DETAILED DESCRIPTION OF THE PREFERRED EMBODIMENTS

The building pane according to this invention is a laminated pane, which enables greater security to be assured. The connecting organic polymer, bonded between the first and second glass sheets, is for example of the polyurethane or polyvinyl butyral (PVB) type, preferably chosen from among those which have the better capabilities for filtering ultra-violet radiation, that is to say, more especially those containing "anti-U.V." dopants, such as derivatives of the benzo-phenols, benzo-triazoles type or other tri-azolic derivatives. This composite structure thus assures a very good protection for the ion-conducting organic polymer and the other films of the system, in particular the film of electrochromic material and the counter-electrode, which may have an accelerated aging in the case of high exposure to the ultra-violet radiation. If desired, the polymer of polyurethane or PVB type or the first sheet of glass are colored, which enables the appearance of the glazing to be modified.

Furthermore, the solar factor of the building pane according to this invention in very substantially improved if the face, towards the intermediate layer of gas of at least one of the panels is coated with a film of the type known as low-emissivity, for example of the type produced by pyrolitic deposition of a tin and/or indium oxide or, even more effectively, by a metal deposition, notably of silver, sandwiched between two protective films of metallic oxides.

As already mentioned, it in important for the electrochromic system to be situated in specific conditions suitable for preventing its degradation, notably by using seals which, while they enable rigorous sealing to be ensured, make possible also an electrical continuity between the electrochromic system and the outside, where there is situated, in particular, the electrical supply box enabling the applied voltage to be chosen across the transparent electrically conducting films and/or the switching time to be chosen an a function of the final coloration state desired and of the coloration state before switching. On the other hand, the limitations of industrial production mean that it must be possible to separate the steps of assembling the double glazing from the preparation of the electrochromic system both in time and in space. The electrochromic system should, therefore, be relatively autonomous. In the same spirit, the assembly configuration chosen should preferably be comparatively simple and able to be carried out by the ordinary techniques for the production of building panes.

In accordance with a second form of embodiment of the invention, this in achieved by an electrically controllable solar building pane composed of two panels spaced apart by a layer of an intermediate gas, the panel towards the outside of the building comprising a variable transmission system of the electrochromic type. Said external panel in constituted of a composite structure comprising, between two glass sheets, a stack of functional films including, notably a transparent electrically conducting film, a film of a cathodic electrochromic material, an ion-conducting organic polymer, a film of an anodic electrochromic material and a transparent electrically conducting film, this stack of functional films being isolated from the outside by at least three sealing joints.

Preferably, the glass sheet facing towards the outside is replaced by a pane of the laminated type comprising at least two glass sheets assembled together by an organic polymer which filters the ultra-violet radiation. It is then especially advantageous to use an assembling configuration including, in the composite assembly facing towards the outside, a sheet of glass of reduced dimensions compared with those of the two sheets which surround it, so as to define a peripheral groove serving for the seating of at least one peripheral seal.

To define a building pane having an electrically controllable solar factor, comprising for this purpose an electrochromic system, the first question that arises is that of the optimum configuration. To determine this configuration, the present inventors have created different classes of configurations by calculating the optical performances by modelling. These various configurations have been obtained with an electrochromic system constituted of two glass substrates separated by a stack comprising the following functional films: electrically conducting film/cathodic electrochromic material/ion-conducting organic polymer/anodic electrochromic material/electrically conducting film.

The glass substrates used for the electrochromic system are float glass sheets of 3 mm thickness of the "PLANILUX GLACE CLAIRE" type (registered trade mark by the company SAINT-GOBAIN VITRAGE INTERNATIONAL), the light factors in transmission and in reflection being, respectively, 91% and 8%, the solar factor 89% and the energy factors in transmission, reflection and absorption respectively 87%, 8% and 5%.

As an indication, the characteristics of each of the materials used in the different functional films of the stack are as follows:

electrically conducting films: indium oxide doped with tin, deposited by magnetron cathodic sputtering of thickness 200–600, preferably 400 nanometers and square resistance less than or equal to 5 ohms, cathodic electrochromic materials: tungsten oxide $WO_3$, deposited by reactive magnetron cathodic sputtering from a tungsten target in the presence of oxygen under a pressure of 50 millitors of an argon-oxygen mixture (15%) for a thickness of 100–400, preferably 300 nanometers, anodic electrochromic material: iridium oxide, deposited by cathodic sputtering assisted by a magnetic field under a pressure of 6 millitors of a gaseous mixture of oxygen/hydrogen in a ratio by volume 80/20, of thickness 40–70 , preferably 55 nanometers, optionally with a preinsertion of the protons by soaking in an acid bath, ion-conducting organic polymer: solid solution of anhydrous phosphoric acid in polyoxyethylene, 50–150, preferably 100 micrometers in thickness with a conductivity at 20° C. of $9 \times 10^{-5}$ $ohm^{-1} \cdot cm^{-1}$ and a light transmission greater than 85%. The ion-conducting organic polymer can be prepared by dissolving under anhydrous conditions per liter of solvent, anhydrous phosphoric acid (21.5 g) and polyoxyethylene of molecular mass (Mn) 5,000,000 (density 1.21 g/l, vitreous transition temperature −40° C.; O/H ratio of the number of hydrogen atoms of the acid equal to 0.66). The solvent is a 60/40 mixture by volume of acetonitrile and tetrahydrofuran.

The solution is cast under an atmosphere of controlled humidity (less than or equal to 50 ppm water) by the film-drawing method onto the substrate covered with one or other of the electrochromic material films. The solvent is subsequently evaporated at ambient temperature under dry air for 20 hours.

The assembly of the electrochromic system is carried out according to the teaching of European Patent Application EP-A-477 065, that is to say the superposition of the two substrates—or more exactly of the assemblies: glass/transparent electrically conducting film/electrochromic material and glass/transparent electrically conducting film/electrochromic material/ ion-conducting organic polymer—is preceded by a step of subjection to vacuum while these two assemblies are placed in the assembling position and kept apart from each other. This spacing is advantageously obtained by means of a thermoplastic cord disposed along the periphery of the substrates, the cord being of butyl rubber and/or polyisobutylene, a cord which will creep at high temperature during the assembling by heating and which will therefore contribute to guaranteeing the sealing against water and water vapor of the electrochromic system.

The electrochromic system thus produced has been counted in different panes having the configurations shown in the following table, Examples 1, 2 and 6 corresponding to double glazing configurations, Example 3 to a laminated configuration and Examples 3 and 4 to mixed laminated/double glazing configurations. As a convention, the panels are numbered from the outside to the inside. Unless indicated to the contrary, the glass panels used are of the "PLANILUX TEINTE CLAIRE" type. The term PVB is the conventional abbreviation for a file of polyvinyl butyral. In configuration 6, the internal glass panel is coated on its face in contact with the air layer with a metallic coating of the "PLANITHERM" type (registered trade mark of the company SAINT-GOBAIN VITRAGE INTERNATIONAL), based upon a film of metallic silver of 10 nm thickness inserted into a stack of glass/$SnO_2$ (40 nm)/silver/NiCr (3 nm)/$SnO_2$ (40 nm).

| No. | Configuration | State | $T_L$ (%) | $T_E$ (%) | Solar Factor | $\alpha$ (nm) | $p_0$ (%) |
|---|---|---|---|---|---|---|---|
| 1 | glass 1 = 6 mm<br>air = 12 mm<br>glass 2 = electrochromic | ON<br>OFF | 7<br>29 | 4<br>20 | 0.51<br>0.56 | 481<br>562 | 25<br>5 |
| 2 | glass 1 = electrochromic<br>air = 12 mm<br>glass 2 = 6 mm | ON<br>OFF | 7<br>29 | 4<br>20 | 0.15<br>0.29 | 481<br>562 | 25<br>5 |
| 3 | glass 1 = 3 mm<br>PVB = 0.38 mm<br>glass 2 = electrochromic | ON<br>OFF | 7<br>32 | 4<br>22 | 0.27<br>0.40 | 481<br>564 | 25<br>5 |
| 4 | glass 1 = 6 mm<br>air = 12 mm<br>glass 2 = 3 mm<br>PVB = 0.38 mm<br>glass 3 = electrochromic | ON<br>OFF | 7<br>29 | 4<br>19 | 0.51<br>0.57 | 481<br>560 | 25<br>5 |
| 5 | glass 1 = 3 mm<br>PVB = 0.38 mm<br>glass 2 = electrochromic<br>air = 12 mm<br>glass 3 = 6 mm | ON<br>OFF | 7<br>29 | 4<br>19 | 0.15<br>0.29 | 481<br>560 | 25<br>5 |
| 6 | glass 1 = electrochromic<br>air = 12 mm<br>glass 2 = 6 mm + low emissivity | ON<br>OFF | 6<br>26 | 3<br>15 | 0.11<br>0.24 | 482<br>561 | 24<br>6 |
| 7 | glass 1 = 3 mm<br>PVB = 0.38 mm<br>glass 2 = electrochromic<br>air = 12 mm<br>glass 3 = 6 mm | ON<br>OFF | 7<br>51 | 4<br>35 | 0.15<br>0.44 | 481<br>570 | 25<br>10 |

In the above table, $T_L$, $T_E$, solar factor, $\alpha$ and $P_O$ correspond, respectively, to the light transmission, energy transmission and solar factors, to the wavelength of the dominant tint (in nanometers) and to the purity in the color, these values having been obtained with an electrochromic system, the light transmission of which in the colored state is 7% and in the decolored state is 32% (for configurations 1 to 6) or 57% (configurations 7).

From the above table it is evident that configurations 2, 5 and 6, all three of the double glazing type, with the electrochromic system in the outer panel, best address the problem posed by a modulation of the solar control, with a variation from one to two times in the solar factor in all three cases. Configuration 3 of the laminated type mounted in a monolithic pane certainly gives a considerable difference between the solar factors in the decolored and in the colored state, but they are still at a relatively high level, whereas the performances of the panes mounted in a double glazing configuration are overall much better.

Configurations 2 and 5 are equivalent from the light transmission and solar factor aspect and therefore can be used indifferently if only optical criteria are considered. However, configuration 5 has the advantage of not having direct exposure to the solar radiation of the electrochromic system, which is protected both by the panel of glass of 3 mm thickness and by the PVB film—which may if necessary be chosen from among the PVBs having the highest capacity for filtering ultra-violet radiation.

Configuration 6, which comprises a low-emissivity film in contact with the intermediate layer of air, corresponds to the preferred configuration base because it allows a solar factor in the colored state of only 11% and a solar factor in the decolored state of 24% to be achieved.

Example 7 is a repeat of configuration 5, but with an electrochromic system having a greater contrast, thus with a light transmission in the decolored state for the whole glazing assembly of 51%.

The above table also shows, for the OFF state and therefore the maximum decoloration state, a purity in the color of only 5%, which signifies that the color is in fact virtually imperceptible to the eye and that the eye perceives a neutral color. In contrast, for the ON state, or maximum coloration, the purity in the dominant color is 25%, and therefore this color is quite effectively perceived as the dominant color.

Figure 1:
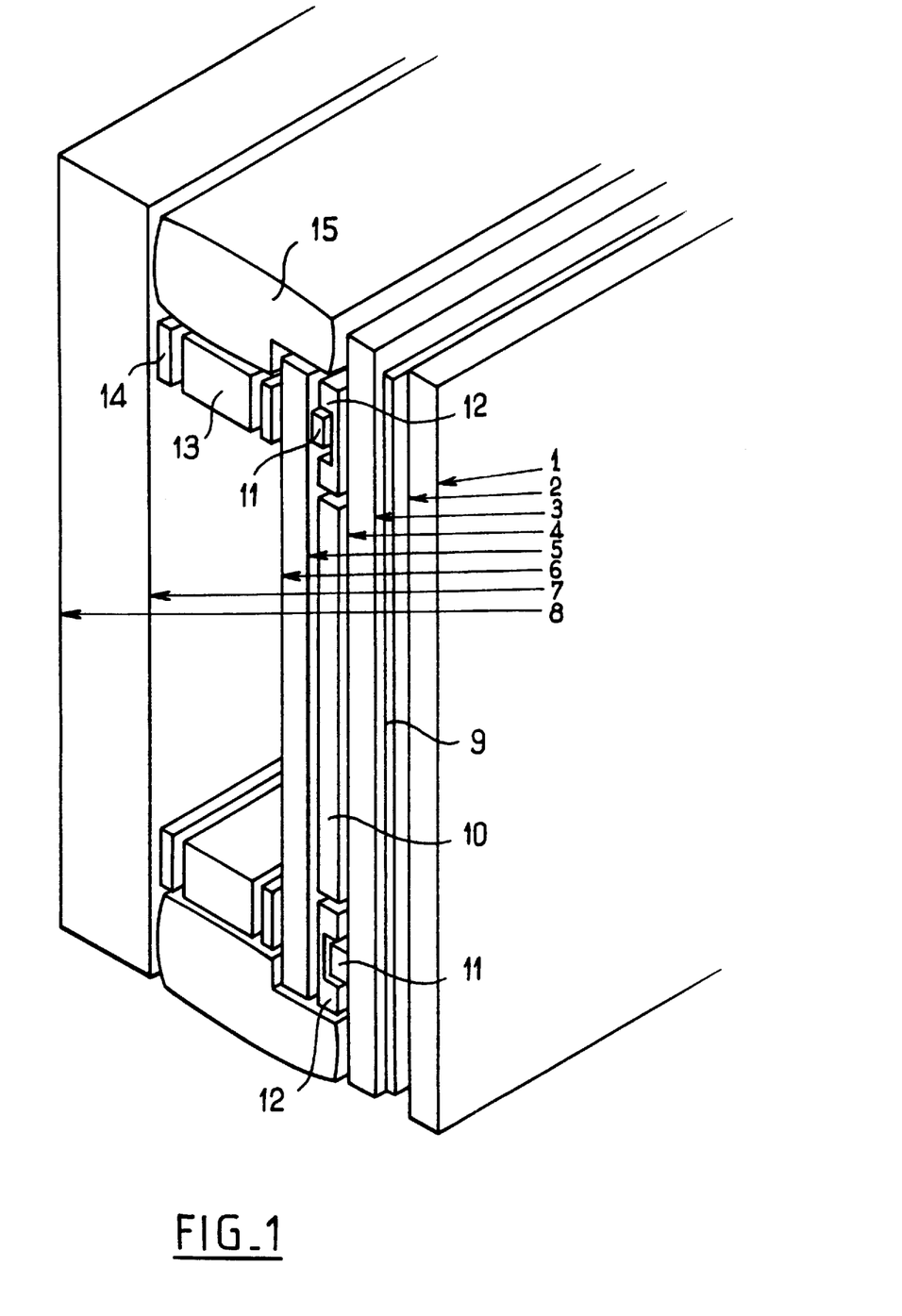
FIG. 1. a general arrangement of a pane in conformity with a preferred form of embodiment of this invention, FIG. 2. a comparative curve of the value of the light transmission as a function of the solar factor, obtained by modelling, in a pane of the type illustrated in FIG. 1 and of various commercial panes for solar protection, FIG. 3. a simplified view of the assembling arrangement of the pane shown schematically in FIG. 1, FIG. 4. another example of the assembling arrangement according to this invention, FIG. 5. a third example of an assembling arrangement showing the electrical connection elements.

Now referring to the drawings, wherein like reference numerals designate identical or corresponding parts throughout the several figures, and more particularly to FIG. 1, thereof.

In FIG. 1 there is thus shown schematically a double glazing pane corresponding to a preferred configuration comprising 4 panels of glass, or 8 faces numbered from 1 to 8 and arranged in the following manner: first, a first panel of glass 3 mm thick with face 1 on the outside of the building and face 2 glued to a sheet of PVB 9 of 0.38 mm; secondly, a second panel of glass also 3 mm thick, to which belongs face 3 glued to the same PVB sheet 9 and face 4 coated with a transparent electrically conducting film of ITO, and then with a film of iridium oxide. On this iridium oxide film there adheres the ion-conducting organic polymer 10 of 100 micrometers thickness. A third panel of glass to which belongs faces 5 and 6 complete, the outer panel.

The electrochromic system should also comprise elements for connecting to an electrical supply device by operating on the electrical side as indicated in the EP Patent Application. For this purpose it is advantageous to provide electrically conducting films which, on one side, are deposited right up to the edge of the panel and, on the other side, stop at, for example, 1 cm from the edge, the panels being mounted in opposition so that the electrical feed strip 11, deposited for example by screen printing on the marginal strip of one of the panels, shall not be facing the electrically conducting film of the opposite panel, so as to avoid short circuits. For the same purpose, near the edges, the ion-conducting organic polymer film is preferably replaced by a seal 12, for example based upon butyl rubber, a seal which also fulfills a role during the assembling of the system by holding the second and third glass panels spaced apart during the degassing phase and contributes to preserving the system against penetration of liquid water or water vapor.

This outer assembly of 3 glass panels forming a complex composite structure is associated by a mounting of the double glazing type with a fourth panel of glass 6 mm thick, which thus carries faces 7 and 8. The face 7, or possibly the face 6, is provided with a low-emissivity film (typically based upon silver, but an oxide film of ITO or $SnO_2$ type doped with fluorine may also be used although the emissivity performances are slightly lower). This association of the double glazing type is realized by the well known techniques of this art, for example by using a peripheral aluminum frame 13, glued to the glass by cords of butyl rubber 14 and lined with a second sealing joint 15 based upon polyurethane or polysulfide. The air gap formed between faces 6 and 7 has, for example, a thickness of 8–16, preferably 12 mm.

This optimized configuration may certainly include many variants. It should, thus, be commented that the thicknesses of the glass and of the air gap indicated may, of course, be modified without departing from the scope of this invention. Similarly, the invention is in no way limited to the type of electrochromic system described above, and any system comprising an ion-conducting organic polymer conductive of ions (protons, $Li^+$, $Na^+$, . . . ) can be used instead.

Another important aspect of the invention is that the ON/OFF states correspond, in fact, only to two extreme states and that all the intermediate states of light transmission may be obtained by varying, for example, the switching times or voltages.

Figure 2:
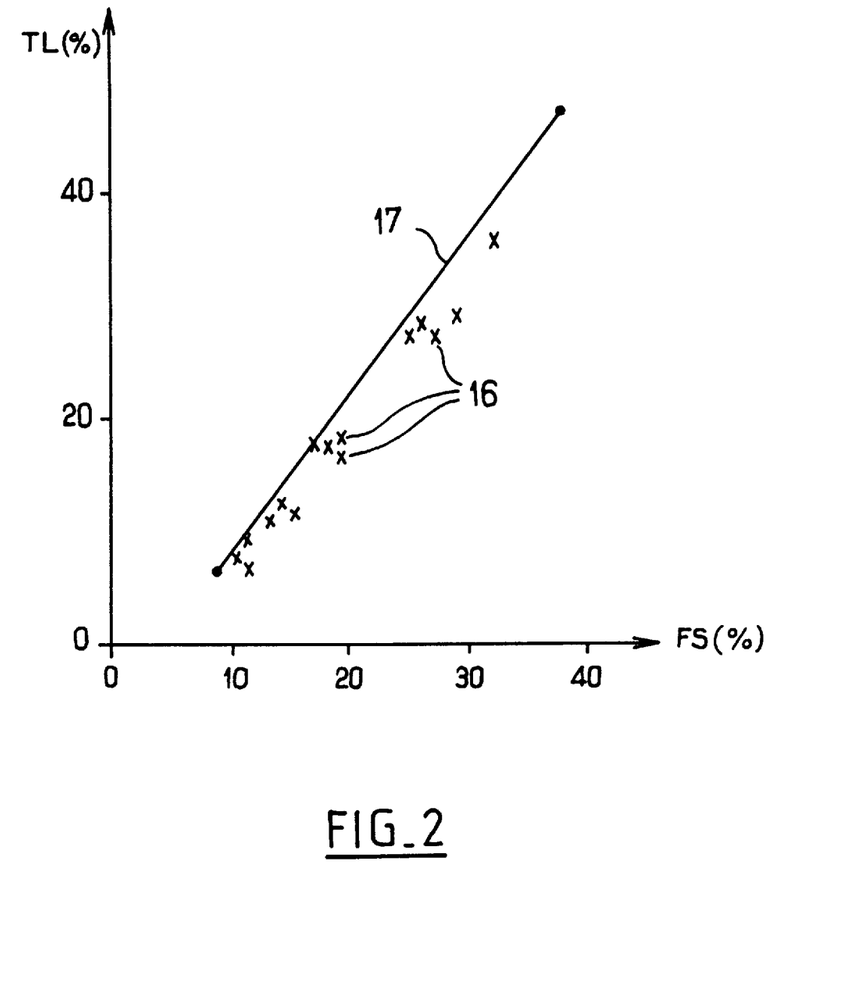

FIG. 2 illustrates the advantage resulting therefrom. In this FIG. 2, there have in fact been plotted the light transmission values (TL expressed in percentages) as a function of the solar factors (FS expressed in percentages) for a series of double glazing systems (glass 6 mm; air gap 12 mm; glass 6 mm) the outer wall being formed of a solar protective pane sold commercially under the trademark COOL-LITE by the company GLACERIES DE SAINT-ROCH, this pane being typically produced by cathodic sputtering under vacuum creating, for instance, a stack of the type ZnSnO/nitrided steel/$TiO_2$ or TiN, the thickness of the ZnSnO film varying from 10 to 100 nm depending upon the tint desired, that of the nitrided steel film between 15 and 45 nm (the larger thicknesses corresponding to the smaller solar factors) and the titanium oxide film being typically of 10 nm. The sputtered film is positioned on the side towards the air gap.

As the series 16 of points indicated on FIG. 2 shows, this type of stack enables a very wide range of performances to be covered, but it must certainly be noted that each point corresponds to a given stack and that in order to modify the solar factor there is no other way than by replacing the pane. In contrast, the straight line 17 representative of a pane according to this invention, and which covers basically the same range of solar factors, is obtained with one and the same pane, the light transmission of which can vary from 7 to 50% from the OFF state to the ON state.

Figure 3:
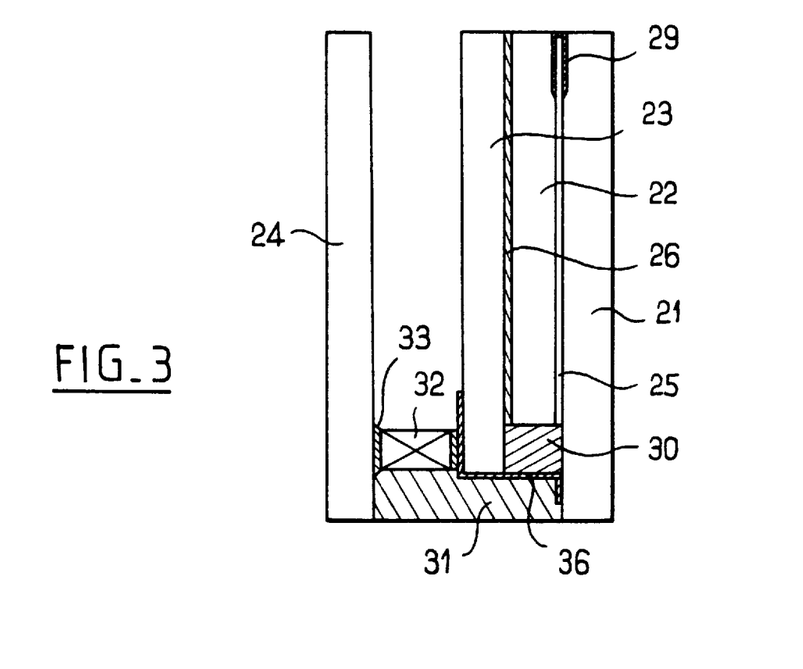
Figure 4:
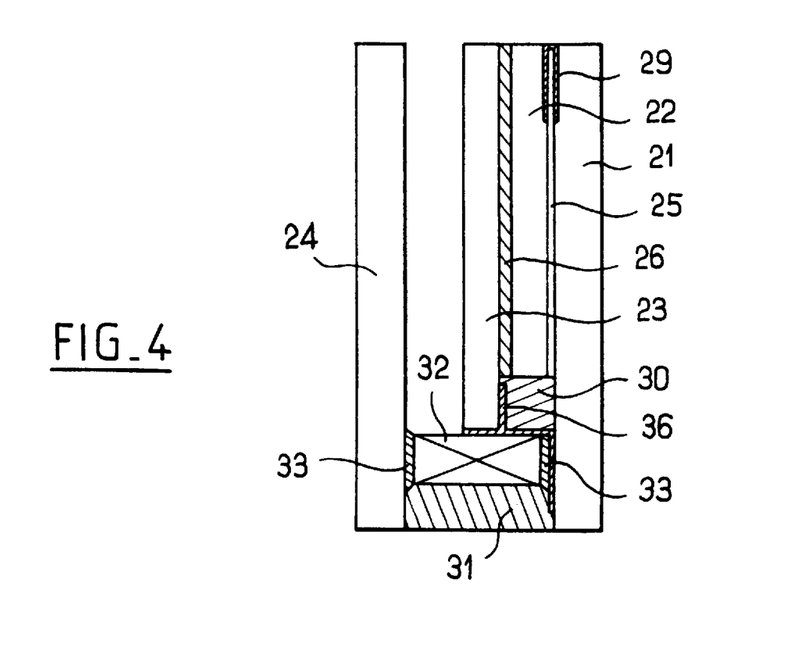
Figure 5:
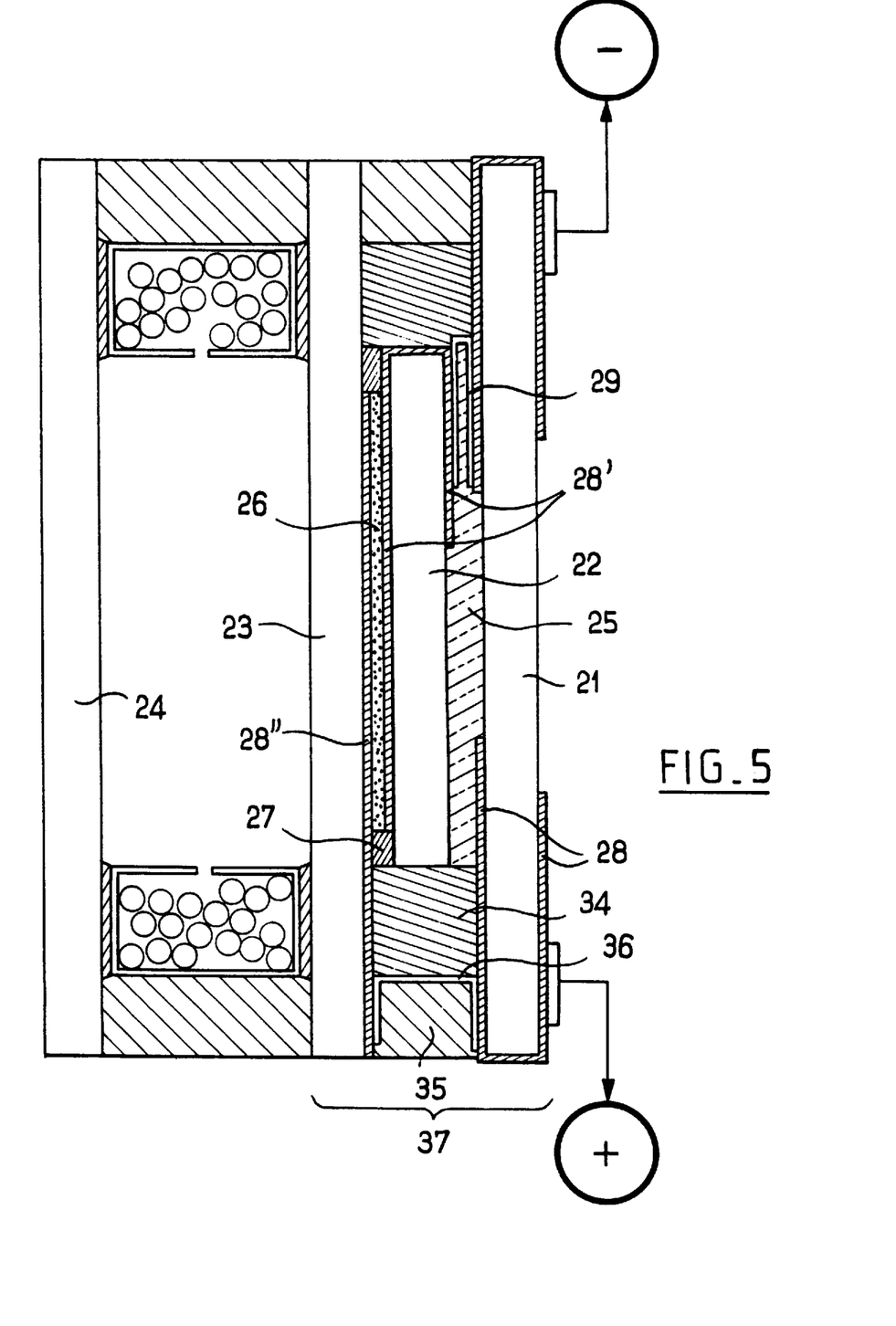

FIGS. 3, 4 and 5 bring out another important aspect of the building panes according to this invention, that is to say the assembling configuration chosen. FIG. 5 proposes a relatively complete assembling layout, whereas FIGS. 3 and 4 show other possible configurations, the configuration of FIG. 3 repeating that proposed in FIG. 1.

In all these cases, the double glazing comprises four glass sheets, numbered 21, 22, 23 and 24 from the outside towards the interior of the building, the glass sheet 22 being in all cases the smallest. The sheets 21 and 22 are joined together by an organic film 25 of the PVB or PU type, comprising anti-U.V. additives. Between the sheets 22 and 23 there is the stack 26 of the functional films of the electrochromic system. As already mentioned, this stack is protected laterally by a seal 27 (visible in FIG. 5 on both sides, this seal forming in fact a continuous frame), composed for example of butyl rubber with a desiccant of the molecular sieve type. Furthermore, the glass sheets 21, 22 and 23 comprise electrically conducting screen-printed zones 28, 28' and 28".

The three configurations differ essentially by the size and position of the plate 23. In the first two proposed configurations (FIGS. 3 and 4) this plate 23 is of dimensions intermediate between those of the outer plate 21 and those of the plate 22, with the result that the plates 21 and 23 delimit an inner throat or groove 30, into which a seal is injected, for example of the polysulfide, polyurethane or silicone type, and that the plates 24 and 21 delimit, for their part, an outer throat or groove 31 into which is injected a seal of the same type.

In the case of FIG. 4, the seals 30 and 31 are separated by the brace frame 32, which delimits the thickness of the air gap between the panels 23 and 24 and is glued to the panels 24 and 21 by thin cords of mastic 33, for example based upon butyl rubber. In contrast, in the case of FIG. 3, the bracing frame is situated directly between the panels 23 and 24. The configuration of FIG. 4 enables 4 thicknesses (instead of 3) of seal to be interposed between the electrochromic system. On the other hand, it makes the placing of the foils rather difficult, as will be seen later.

In the configuration of FIG. 5, the panel 23 has the same dimensions as the panel 21, the groove defined by the inner panel 22 being filled by two superimposed seals 34 and 35 (the inner seal being, for example, a butyl rubber with molecular sieve and the outer seal, for example, of the polysulfide type). This configuration results, as in the case of FIG. 3, in an assembly of 3 seals which isolate the electrochromic system from the outside.

Let us now turn in greater detail to the connecting elements.

In the three configurations, on the outer plate 21, the screen-printed regions 28 are two in number (a negative pole at the top and a positive pole at the bottom) extending in the vicinity of the edges in a horseshoe shape, so as to permit a lead from the connections of the supply box by the outer face (it will be self-evident that in the layouts proposed, the part shown is essentially the part of the pane mounted within the rebate and that the central part is not drawn to a reduced scale).

On the plate 22, the screen printing runs from one edge of the face to the whole height of the face 4. The electrical continuity with the negative pole of the part 28 is assured by means of a U-shaped metal foil 29.

The plate 23 is provided, for its part, over its entire height, with a screen printed region 28", connected to the positive pole 28 by a foil 36, which is S-shaped (FIGS. 3 and 4) or U-shaped. In the case of FIG. 3, the screen printed zone 28" should comprise a return on the face 6 (internal face of the plate 23), although this arrangement does lead to a supplementary stress during the screen printing, it does enable the absence of any short-circuit to be assured whereas, on the contrary, the position of the foil proposed in FIG. 4 does lead to such a risk.

With FIG. 5, the risk is again very small because the foil is isolated from the electrochromic system by the entire thickness of the seal 35. It may furthermore be noted that the foil 36 is entirely protected from the outside by the seal 35, so that the pane of FIG. 5 can be likened to an ordinary double glazing pane formed of a panel 24 and of a panel 37, without special precautions needing to be taken at the time of assembling (except for the positioning on face 1 of the panel 21). This configuration is, for this reason, advantageous by comparison with the other two, in which the foils 36 are not protected until the assembling of the double glazing is completed.

To prevent any problem of short-circuits due to the electrically conducting character of certain seals and, more especially, of the seals based upon butyl rubber, the screen printed portions in contact with these seals are preferably coated with a protective enamelled film, made of an electrically non-conducting enamel.

As already mentioned comparing the configurations of examples 2 and 6, the solar factor decreases if the configuration comprises an IR-property film of a low emissivity film.

The following table shows some configuration differing from configuration 7 by an IR-property film, on faces 2, 6 or 7.

| No. | Emissivity of the film | Face | $T_L$ ON | $T_L$ OFF | Solar factor ON | Solar factor OFF | A ON |
|---|---|---|---|---|---|---|---|
| 8 | No film |  | 6 | 47 | 0.15 | 0.44 | 0.88 |
| 9 | 0.11 | 6 | 6 | 47 | 0.09 | 0.33 | 0.88 |
| 10 | 0.11 | 7 | 6 | 47 | 0.11 | 0.37 | 0.88 |
| 11 | 0.04 | 6 | 6 | 47 | 0.08 | 0 33 | 0.88 |
| 12 | 0.04 | 7 | 6 | 47 | 0.11 | 0.33 | 0.88 |
| 13 | 0.04 | 2 | 6 | 47 | 0.12 | 0.33 | 0.69 |

Examples 9, 10 use a low-emissivity film based upon a film a metallic silver (like "PLANITHERM" type).

Examples 11, 12 and 13 use a low-emissivity film based upon a multi-silver layers film.

The lowest solar factors are achieved with the film on face 6. If the film is on face 2 (or which is equivalent on face 3), the absorption factor ($A_{ON}$, %) decreases and therefore, the glazing temperature also decreases. It is thus possible to combine a film on face 6 and another film on face 2 (said film on face 2 can also be a reflecting layer).

Accordingly, in a further embodiment of the invention, a second electrochromic element EE replaces the film on face 6. It results in a configuration of the type glass/PVB/glass/EE/glass/PVB/glass/EE/glass/air gap/glass or, if the EE has a good ultra-violet radiation resistance, of the type glass/EE/glass/PVB/glass/EE/glass/air gap/glass.

Such a configuration with two electrochromic elements permits to achieve in the colored state, a light transmission less than 1% and a solar factor less than 0,05. Nevertheless, in the decolored state, the light transmission is only 25%.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electrically controllable solar building pane, comprising:
  a) an external electrochromic first panel comprising:
    i) a first glass sheet;
    ii) an electrochromic stack of functional films comprising:
      a) a transparent electrically conducting film;
      b) a cathodic electrochromic material film;
      c) an ion-conducting film;
      d) an anodic electrochromic material film; and
      e) a transparent electrically conducting film;
    iii) a second glass sheet; and
  b) a second panel,
  wherein said first and second panels are spaced apart by a layer of intermediate gas, said first glass sheet is a laminated pane comprising at least two glass sheets bonded together by an organic polymer which is filtering to ultra-violet radiation, said first glass sheet or said second glass sheet comprises an electrically conducting screen-printed region, wherein said screen-printed region is protected by a film of electrically non-conducting enamel.

2. The building pane of claim 1, further comprising:
  a succession of at least three sealing joints located entirely between said first glass sheet and said second panel, wherein at least two of said three sealing joints are chemically different materials, and said electrochromic stack of functional films are laterally isolated from the outside by said succession of at least three sealing joints.

3. The building pane of claim 2, wherein said first glass sheet is a laminated pane having an inner glass sheet and an outer glass sheet, wherein said inner glass sheet is smaller than said outer glass sheet and is smaller than said second glass sheet, and wherein said second glass sheet is smaller than said outer glass sheet.

4. The building pane of claim 3, wherein said outer glass sheet and said second glass sheet define a first groove therebetween, said first groove containing a first of said three sealing joints.

5. The building pane of claim 4, wherein said outer glass sheet and said second panel define a second groove therebetween, said second groove containing a second of said three sealing joints.

6. The building pane of claim 5, wherein said first sealing joint comprises butyl rubber and said second sealing joint comprises polysulfide.

7. The building pane of claim 3, further comprising a brace frame between said second glass sheet and said second panel.

8. The building pane of claim 3, further comprising a brace frame between said outer glass sheet and said second panel.

9. The building pane of claim 1, having a light transmission $T_L$ in the range of 7 to 51% and a solar factor in the range of 0.15 to 0.44 when said electrically controllable building pane is in the on-state and off-state, respectively.

10. The building pane of claim 1, wherein said second panel is of identical dimensions with said external electrochromic first panel.

11. The building pane of claim 1, wherein said ion-conducting film comprises an organic polymer.

12. The building pane of claim 1, wherein said ion-conducting film is colored.

13. The building pane of claim 1, wherein said cathodic electrochromic material film is tungsten oxide.

14. The building pane of claim 1, further comprising a low-emissivity film on the face of at least one of said first panel or said second panel which faces said intermediate gas layer.

15. The building pane of claim 14, wherein said low-emissivity film is an IR-property film.

16. The building pane of claim 15, wherein said IR-property film is on said first panel.

17. The building pane of claim 15, wherein said IR-property film is on said second panel.

18. The building pane of claim 15, wherein said IR-property film contains at least one metallic layer.

19. The building pane of claim 18, wherein said IR-property film contains a stack of metallic layers.

20. The building pane of claim 18, wherein said IR-property film contains a silver layer.

21. The building pane of claim 1, further comprising a second electrochromic stack of functional films.

22. The building pane of claim 1, further comprising means for applying a voltage across said transparent electrically conducting film.

23. The building pane of claim 1, comprising an electrically conducting screen-printed region on said first glass sheet and on said second glass sheet, wherein said screen-printed region on said first glass sheet and said screen-printed region on said second glass sheet are electrically connected by means of a U-shaped metal connection.

24. The building pane of claim 1, comprising an electrically conducting screen-printed region on said first glass sheet and on said second glass sheet, wherein said screen-printed region on said first glass sheet and said screen-printed region on said second glass sheet are connected by means of an S-shaped metal connection.

25. The building pane of claim 1, wherein each of said transparent electrically conducting films extends from a first edge of said first panel to at least one centimeter from the edge opposed to said first edge of said first panel.

26. An electrically controllable solar pane, comprising starting from the exterior of said solar pane:
 a composite structure comprising a first outer glass pane, an organic polymer layer which is a filter to ultra-violet light, a second glass pane, an electrochromic variable transmission system comprising a stack of functional films including a transparent electrically conductive film, a film of a cathodic electrochromic material, an ion-conducting film, a film of an anodic electrochromic material and a transparent electrically conductive film, and a third glass pane,
 wherein said solar pane is a laminated pane mounted in a monolithic glazing.

27. The solar pane of claim 26, wherein said ion-conducting film comprises an organic polymer.

28. The solar pane of claim 27, wherein said ion-conducting film is colored.

29. The solar pane of claim 26, having a luminous transmission of about 7% in a colored state and a luminous transmission of about 32% in a decolored state.

30. The solar pane of claim 26, wherein said composite structure forms a first panel spaced apart from a second panel by a layer of an intermediate gas.

31. The solar pane of claim 30, wherein the first panel is on an exterior facing side of said solar pane.

32. The solar pane of claim 30, wherein said stack of functional films is isolated from the outside of said solar pane by a succession of at least three sealing joints.

33. The solar pane of claim 30, wherein said panels are of the same size.

34. The solar pane of claim 30, further comprising a solar protective layer on a face of at least one of said panels toward the intermediate gas layer.

35. The solar pane of claim 30, further comprising a low-emissivity layer on a face of at least one of said panels directed toward said intermediate gas layer.

36. The solar pane of claim 35, wherein said low-emissivity layer is an IR-property film.

37. The solar pane of claim 36, wherein said IR-property film is on said first panel.

38. The solar pane of claim 37, wherein said IR-property film contains a stack of metallic layers.

39. The solar pane of claim 37, wherein said IR-property film contains a silver layer.

40. The solar pane of claim 36, wherein said IR-property film is on said second panel.

41. The solar pane of claim 36, wherein said IR-property film contains at least one metallic layer.

42. The solar pane of claim 35, wherein said low-emissivity layer is a metallic layer.

43. The solar pane of claim 35, wherein said low-emissivity layer is an oxide-base layer.

44. The solar pane of claim 35, wherein said low-emissivity layer is selected from the group consisting of silver, ITO and fluorine-doped tin oxide.

45. The solar pane of claim 26, wherein said second glass pane is smaller than said first outer glass pane and said third glass pane, so as to form a peripheral groove in which at least one peripheral sealing joint is located.

46. The solar pane of claim 45, wherein said peripheral groove is filled by superimposing two sealing joints, a first sealing joint of butyl rubber covered by a second sealing joint of polysulfide.

47. The solar pane of claim 26, wherein said third glass pane has dimensions which are intermediate between the dimensions of said first outer glass pane and said second glass pane, so that said first glass pane and said second glass pane form a groove.

48. The solar pane of claim 26, wherein said third glass pane has the same dimensions as said first outer glass pane.

49. The solar pane of claim 26, wherein said ultraviolet radiation filtering organic polymer is colored.

50. The solar pane of claim 26, further comprising electrically conducting screen-printed regions.

51. The solar pane of claim 50, wherein said screen-printed regions in contact with a sealing joint are protected by a film of electrically insulating enamel.

52. The solar pane of claim 50, wherein said electrically conducting screen-printed regions further comprise a U-shaped metal foil electrical connection.

53. The solar panel of claim 52, wherein said metal foil connection is isolated from said electrochromic system and from the exterior of said solar pane by two sealing joints.

54. The solar panel of claim 50, wherein said electrically conducting screen-printed regions further comprise an S-shaped metal foil electrical connection.

55. The solar pane of claim 54, wherein said metal foil connection is isolated from said electrochromic system and from the exterior of said solar pane by two sealing joints.

56. The solar pane of claim 26, wherein said cathodic electrochromic material comprises tungsten oxide.

57. The solar pane of claim 26, further comprising a solar protective layer on a face of said first outer glass pane in contact with said organic polymer layer.

58. The solar pane of claim 57, wherein said solar protective layer comprises a stack of silver layers.

59. The solar pane of claim 26, further comprising a layer reflective in a visible wavelength on a surface of said first outer glass pane in contact with said organic polymer layer.

60. The solar pane of claim 26, comprising two of said electrochromic systems.

61. The solar pane of claim 26, further comprising a second stack of functional films.

62. An electrically controllable solar building pane, comprising:
- a) an external electrochromic first panel comprising:
  - i) a first glass sheet;
  - ii) an electrochromic stack of functional films comprising:
    - a) a transparent electrically conducting film;
    - b) a cathodic electrochromic material film;
    - c) an ion-conducting film;
    - d) an anodic electrochromic material film; and
    - e) a transparent electrically conducting film,
  - iii) a second glass sheet; and
- b) a second panel,
- wherein each of said transparent electrically conducting films extends from a first edge of said first panel to at least one centimeter from the edge opposed to said first edge of said first panel, said first and second panels are spaced apart by a layer of intermediate gas, and said first glass sheet is a laminated pane comprising at least two glass sheets bonded together by an organic polymer which is filtering to ultra-violet radiation.

63. An electrically controllable solar building pane, comprising:
- a) an external electrochromic first panel comprising:
  - i) a first glass sheet;
  - ii) an electrochromic stack of functional films comprising:
    - a) a transparent electrically conducting film;
    - b) a cathodic electrochromic material film;
    - c) an ion-conducting film;
    - d) an anodic electrochromic material film; and
    - e) a transparent electrically conducting film;
  - iii) a second glass sheet;
- b) a second panel,
- wherein said first and second panels are spaced apart by a layer of intermediate gas, and said first glass sheet is a laminated pane comprising at least two glass sheets bonded together by an organic polymer which is filtering to ultra-violet radiation; and
- c) a low-emissivity film on the face of at least one of said first panel or said second panel which faces said intermediate gas layer.

* * * * *